(12) United States Patent
Heard

(10) Patent No.: US 8,635,730 B2
(45) Date of Patent: Jan. 28, 2014

(54) IN SITU SUB MARINE NET CLEANING AND INSPECTING DEVICE

(75) Inventor: Peter Heard, Snug (AU)

(73) Assignee: MIC Pty Ltd, Goodwood, Tasmania (AU)

( * ) Notice: Subject to any disclaimer, the term of this patent is extended or adjusted under 35 U.S.C. 154(b) by 291 days.

(21) Appl. No.: 13/123,301

(22) PCT Filed: Oct. 2, 2009

(86) PCT No.: PCT/AU2009/001309
§ 371 (c)(1),
(2), (4) Date: Apr. 8, 2011

(87) PCT Pub. No.: WO2010/040171
PCT Pub. Date: Apr. 15, 2010

(65) Prior Publication Data
US 2011/0185519 A1    Aug. 4, 2011

(30) Foreign Application Priority Data
Oct. 10, 2008    (AU) .................. 2008905261

(51) Int. Cl.
*B08B 11/00* (2006.01)
(52) U.S. Cl.
USPC .......................................................... 15/1.7
(58) Field of Classification Search
USPC .............................................................. 15/1.7
See application file for complete search history.

(56) References Cited

U.S. PATENT DOCUMENTS 3,416,176 A * 12/1968 Ravitts ............................ 15/1.7
4,480,569 A * 11/1984 van der Veen et al. ....... 114/74 T
4,926,775 A    5/1990 Andorsen

FOREIGN PATENT DOCUMENTS

| JP | 49-30183 | 3/1974 |
|---|---|---|
| JP | 02-032266 | 2/1990 |
| JP | 02-117247 | 5/1990 |
| JP | 02-268627 | 11/1990 |
| JP | 03-105511 | 5/1991 |
| JP | 04-234927 | 8/1992 |
| JP | 05-049370 | 3/1993 |
| JP | 5-049370 A | 3/1993 |
| JP | 08-116826 | 5/1996 |
| JP | 8-290131 A | 11/1996 |
| JP | 9-009818 A | 1/1997 |
| JP | 09-044238 | 2/1997 |
| JP | 9-058583 A | 3/1997 |
| JP | 09-076712 | 3/1997 |
| JP | 9-076712 A | 3/1997 |
| JP | 09-107842 | 4/1997 |
| JP | 9-221099 A | 8/1997 |
| JP | 2001-276754 | 10/2001 |
| JP | 2006-312155 | 11/2006 |
| JP | 2007-244940 | 9/2007 |
| WO | 2007/105303 A1 | 9/2007 |

* cited by examiner

*Primary Examiner* — Randall Chin
(74) *Attorney, Agent, or Firm* — Richard M. Goldberg

(57) ABSTRACT

A submarine in-situ net cleaner includes a skid chassis (1) adapted for smooth and snare free sliding across the surface of the net (2), a buoyancy device (3) associated with the chassis to provide the cleaner with buoyancy, a driving device (4) adapted to cooperate with the net (2) and maneuver the cleaner about the surface of the net, a propulsion device (5) adapted to propel the cleaner onto and maintain contact with the net (2) and a cleaning device (6) adapted to remove contaminants from the net including marine fouling from the surface of the net so as to clean the net.

20 Claims, 6 Drawing Sheets

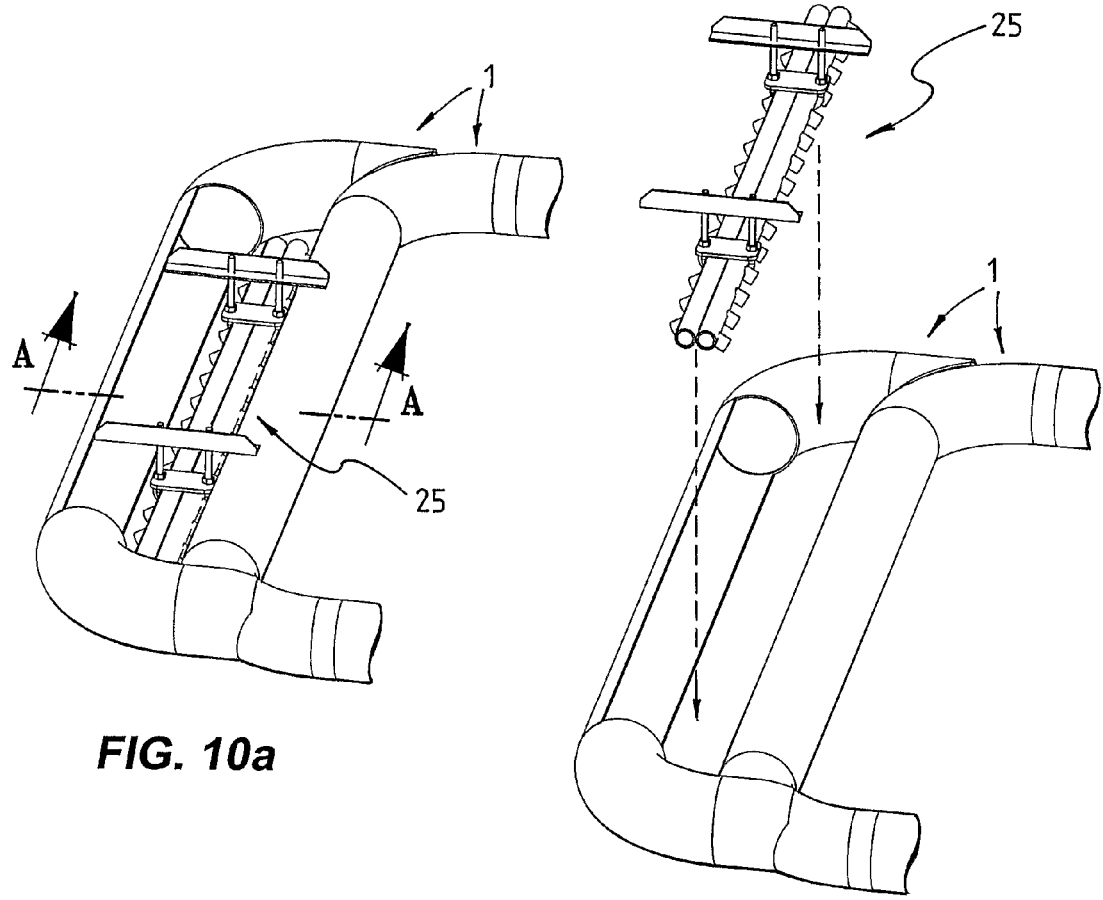
FIG. 10a
FIG. 10b
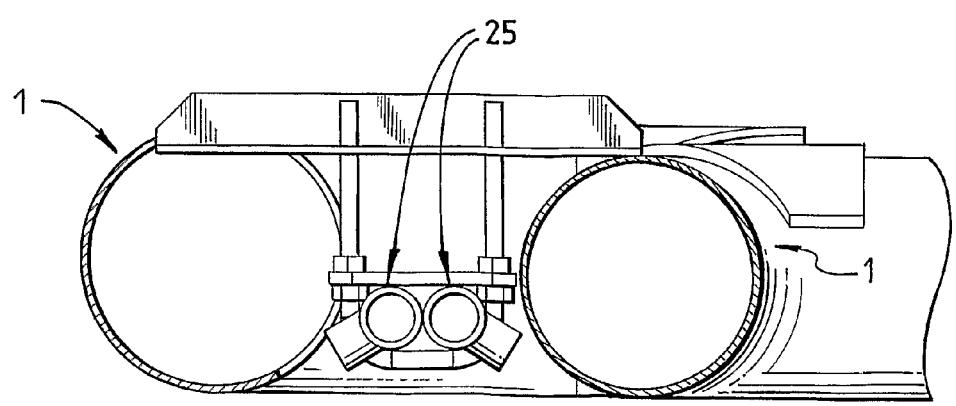
FIG. 11

IN SITU SUB MARINE NET CLEANING AND INSPECTING DEVICE

CROSS-REFERENCE TO RELATED APPLICATIONS

The present application claims priority from Australian Provisional Patent Application No 2008905261 filed on 10 Oct. 2008, the content of which is incorporated herein by reference.

INTRODUCTION TO THE INVENTION

This invention relates to the in situ cleaning of submarine nets and in particular, to a cleaning device adapted to remotely clean and remove algae and similar contamination from submerged nets or the like as used to create under water cages in the salmon farming industry or the like.

BACKGROUND TO THE INVENTION

Submerged aqua-culture nets have a tendency to grow marine fouling algae and other contaminations which block the mesh forming the nets, thereby restricting water flow and eventually preventing any water exchange at all, across the nets. Anti-foul paint and other methods are frequently used on such net meshes in order to slow the rate of contamination accumulation; however, cleaning is always required as the anti-fouling methodologies to date do not provide a complete prevention of the accumulation of marine growth fouling such submerged nets.

In order to clean submerged aqua-culture nets, one or two methodologies have historically been adopted, including the physical removal of the nets from their in situ position, where they are taken ashore and physically cleaned; or, the use of divers sweeping a jet of high pressure water across the nets in order to blast the fouling marine growth from the nets remaining in situ.

Both the above methods of cleaning nets are highly unsatisfactory with a task of physically removing the nets from the submerged position being a huge task requiring very large lifting/handling gear and transportation of the removed nets on boats with the fouled nets weighing as much as 20 tons. Following transportation to shore the nets have to be unwound and physically cleaned and subsequently returned and reinstalled. The alternative, in situ method of cleaning using divers involves a high level of danger and risk to the operators in question, with the divers having to operate within the confines of submersion using a jet of high pressure water swept across the net so as to blast the marine growth from the surface of the net. Whilst the use of divers alleviates the problem of physically removing the nets from the water, it is still an expensive, slow and imperfect solution to the problem with four divers achieving an average of 2500 square meters cleaning per day, being the equivalent to the base and sides of one net alone. Another problem with the use of divers blasting the growth from the nets, is the dislodgement of weed and other marine organisms which drift through the cage of fish, thereby lowering the water quality and stressing the fish within a given cage. As an adaptation of the diving methodology, vacuum cleaning head can be used by divers, which extends the life of the anti-foulant coating as it does not move so much of the anti-foulant during the blasting process and also allows the marine growth and contaminants to be pumped out of the cage environment rather than drifting through the environment. In addition, the vacuuming process as manually applied by the divers is found to be faster than blasting, with four divers being able to achieve approximately 3500 square meters per day.

Nevertheless, the use of divers for cleaning of submerged nets is highly labour intensive, slow and of high risk as it involves divers being in the water for long periods of time and requires a lot of repetitive strenuous movement with the arms and shoulders to remove the hose and suction head around the net as required. The likelihood of decompression illness (bends) is much greater with exertion while diving, making net cleaning a particularly high risk dive activity.

Diving is also an inherently inefficient way of working because of the necessity of having two divers working underwater and two working on the surface at any one given time. In addition, divers are paid for their skills and tend to be more expensive than other staff, with each farming site requiring one dive crew who are primarily required to perform diving for purposes other than cleaning of the submerged nets. Accordingly each dive crew does not have enough "spare" diving time to wash up two nets per day, which is needed to keep up with the average rate of fouling. Most farming sites accordingly manage with the compromised and imperfect cleaning solutions described above, which invariably leads to nets having a greater degree of fouling than is desirable.

One object of the invention is to provide an improved submerged aqua-culture net cleaner.

SUMMARY OF THE INVENTION

In a first aspect the invention provides a submarine in-situ net cleaner comprising a skid chassis adapted for smooth and snare free sliding across the surface of said net, a buoyancy means associated with said chassis to provide said cleaner with buoyancy, a driving means adapted to cooperate with said net and manoeuvre said cleaner about the surface of said net, a propulsion means adapted to propel said cleaner onto and maintain contact with said net and a cleaning means adapted to remove contaminants from said net including marine fouling from the surface of said net so as to clean said net.

The skid chassis preferably includes a generally planar and rectangular formation of tubular material forming curved lower surface skids shaped to avoid snagging of said net.

The chassis may include a cage extending from the lower skids to contain the components of said cleaner in a generally cuboid form. The skid chassis is most preferably formed of tubular stainless steel.

The driving means preferably includes a pair of toothed sprockets positioned within either side of said chassis and suspended from pivoted trailing arms for movement between a retracted position substantially within the chassis cage and an extended position protruding out of said cage past the plane of said skid chassis.

The toothed sprockets are rotationally driven by hydraulic means and can be rotated in either direction at independent speeds. The sprockets are preferably independently driven to allow forward, reverse and steering movement.

The trailing arms are preferably pivoted from the front of said chassis to cause said arms to be automatically pulled downward or extended into any dips in the net thereby maintaining traction over variations in the net mesh surface.

The buoyancy means may include dual buoyancy tanks positioned either side within said chassis cage.

The cleaning means is preferably a vacuum means adapted to draw water and contaminants through and from the surface of said net. The cleaning means may also include a plurality of high pressure water jets adapted to direct a stream of high pressure water onto said nets.

The buoyancy is preferably fixed to allow ease of flotation and maneuverably of said cleaner. The buoyancy is most preferably set at about 10 kg less buoyancy than the submerged weight of the cleaning device.

The net cleaner may also include front and rear video cameras.

The cameras preferably include an automatic cleaning means for the lens which may comprise a flow of water directed across and around the lens environment to prevent settlement of dislodged contaminants.

The water flow is preferably integrated with the propulsion means.

The propulsion means may include a transverse hydraulically driven propeller directing water through said chassis.

BRIEF DESCRIPTION OF THE DRAWINGS

The invention will now be described with reference to one particularly preferred embodiment as detailed in FIGS. 1 through to 8 and the accompanying legend.

FIGS. 10a, 10b and 11 show details of the high pressure water jets

DETAILED DESCRIPTION

Figure 1:
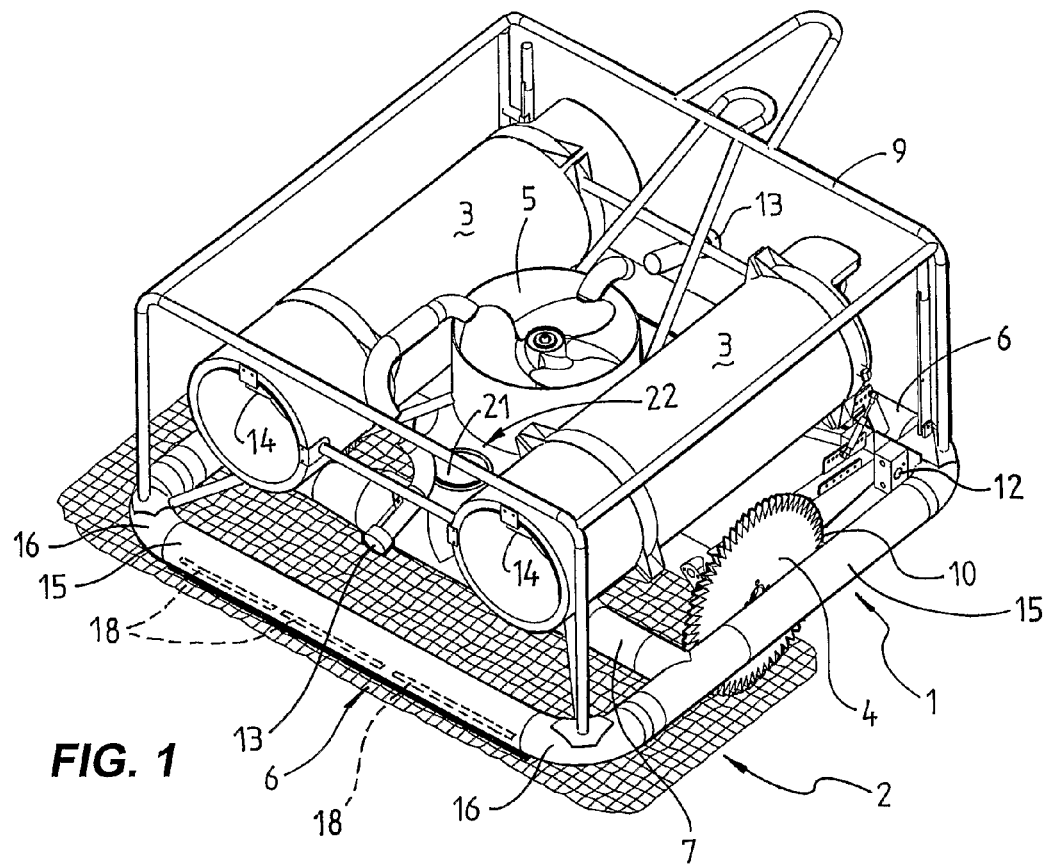
FIG. 1 shows a top perspective view of the net cleaner
Figure 2:
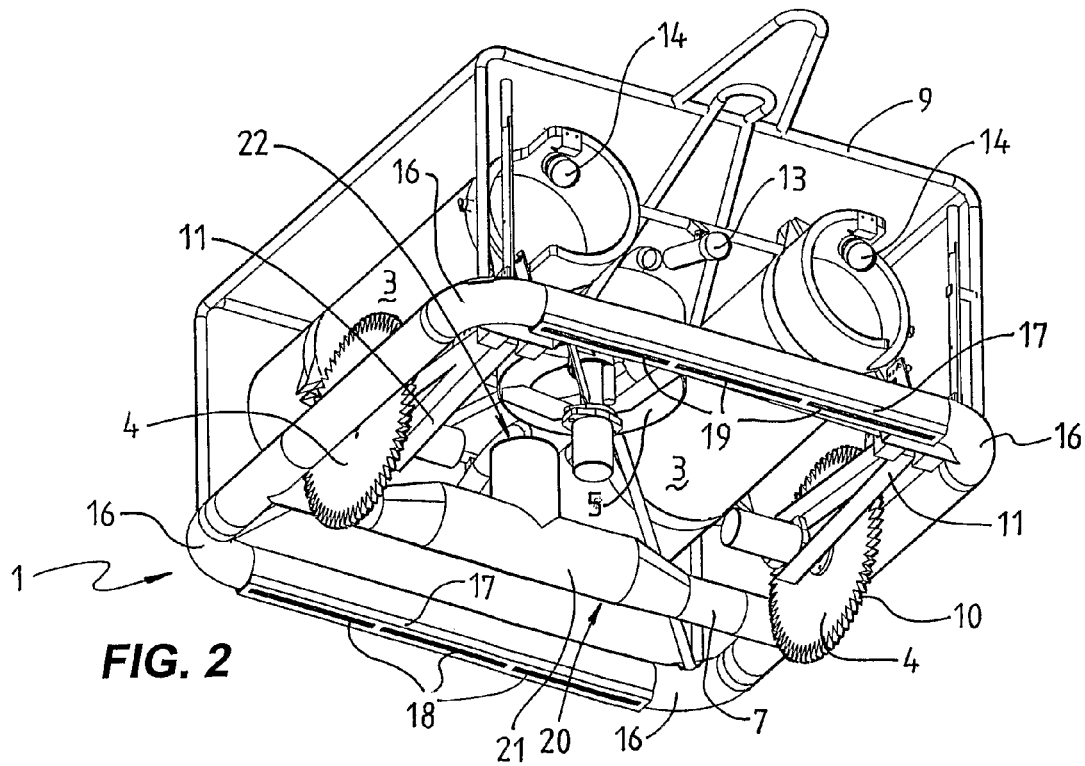
FIG. 2 shows a bottom perspective view of the net cleaner
Figure 3:
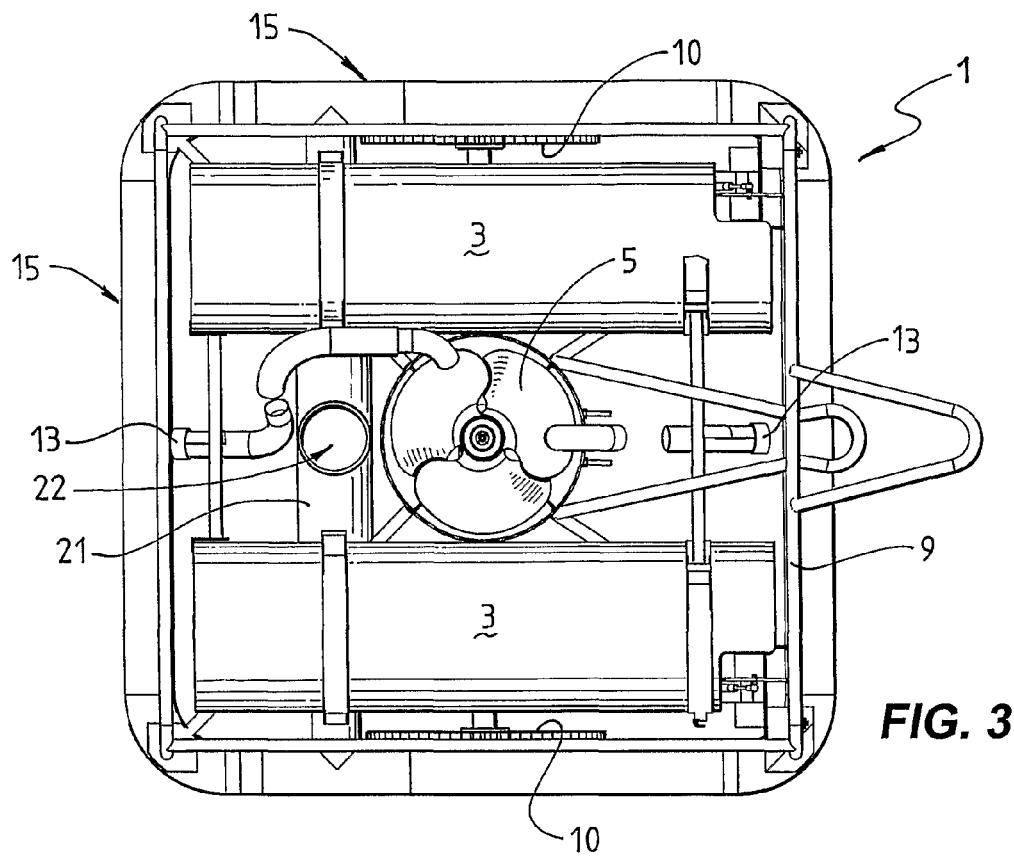
FIG. 3 shows a plan view of the net cleaner
Figure 4:
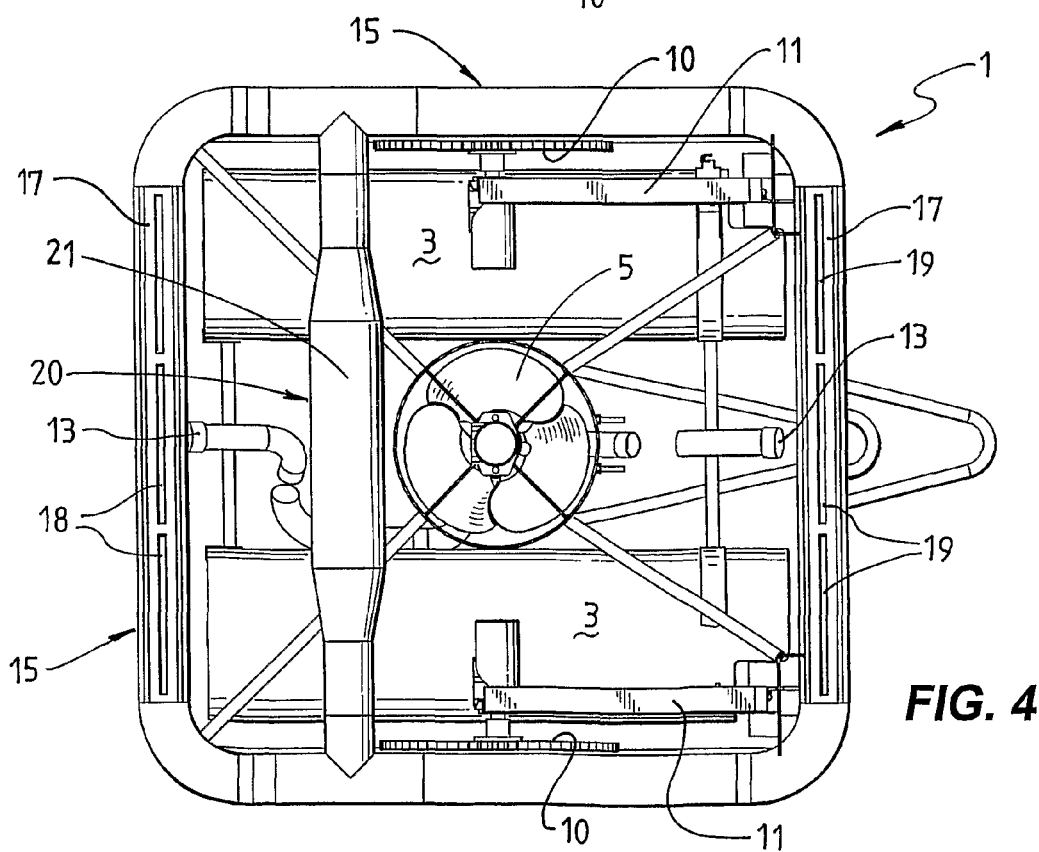
FIG. 4 shows a bottom view of the net cleaner
Figure 5:
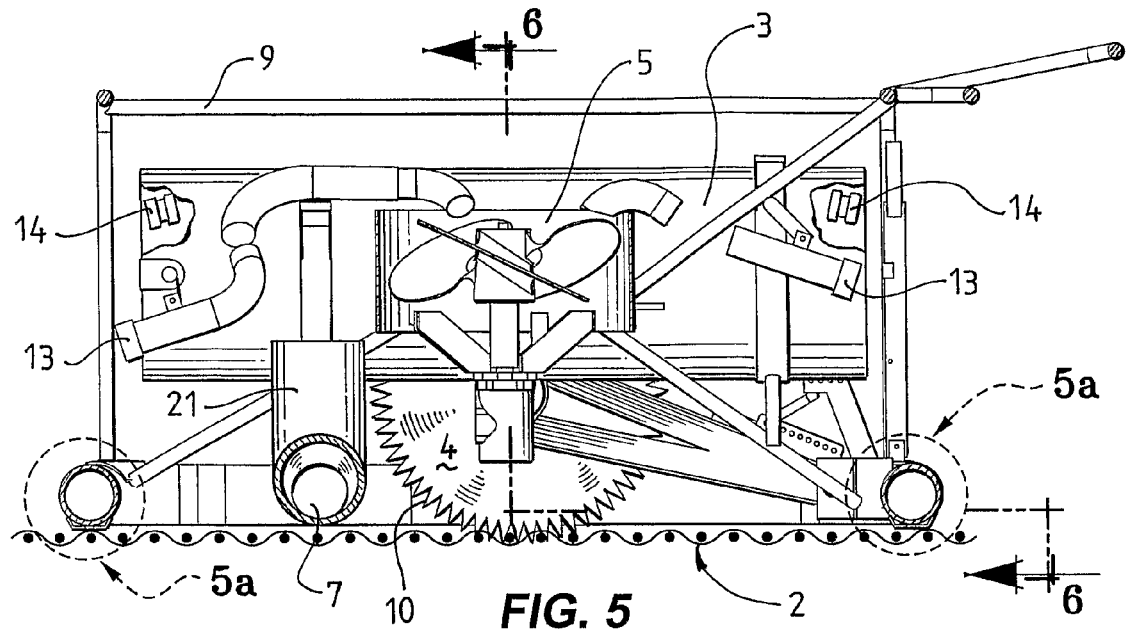
FIG. 5 shows a side view of the net cleaner
Figure 5A:
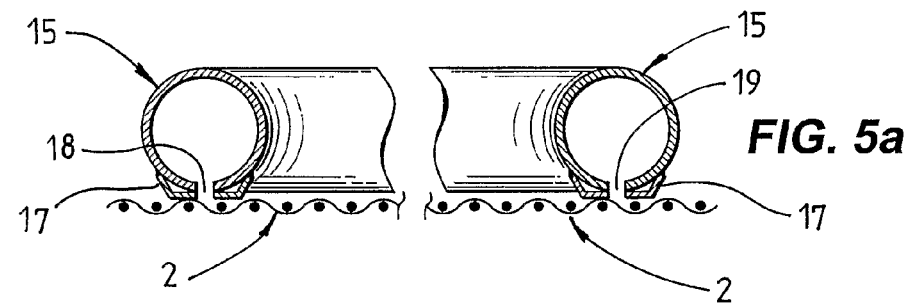
FIG. 5a shows detail of the vacuum slot configuration
Figure 6:
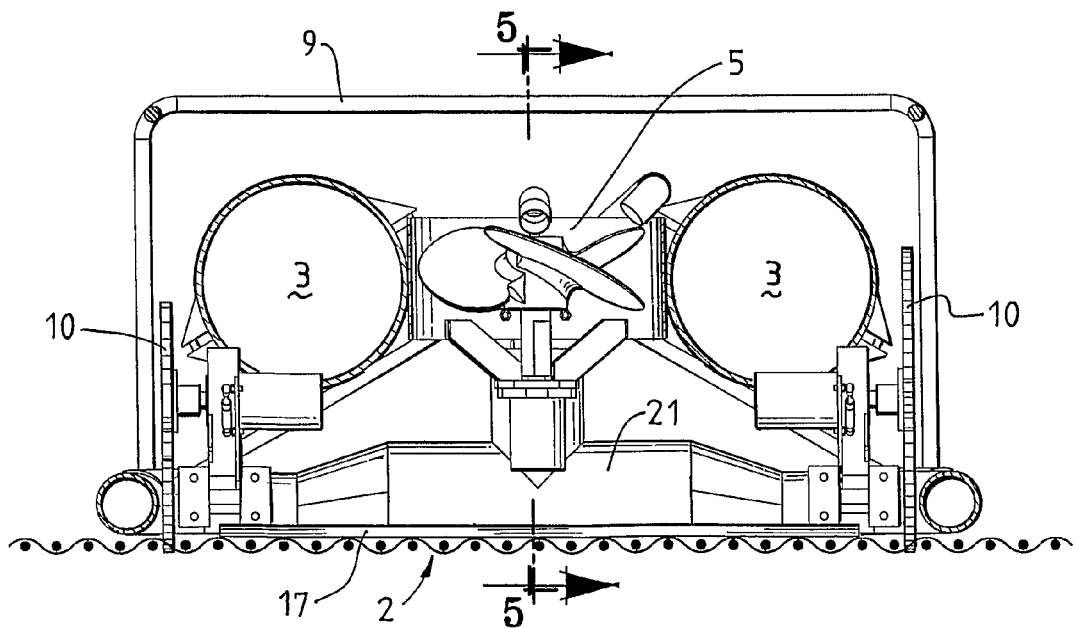
FIG. 6 shows a front view of the net cleaner
Figure 7:
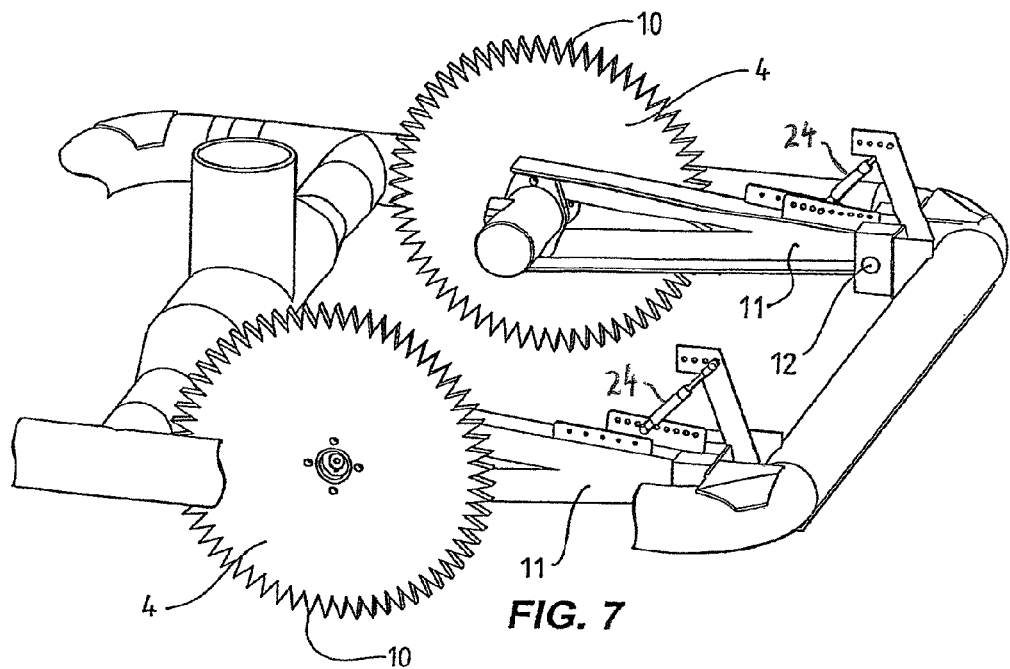
FIG. 7 shows a perspective view of the net cleaner, trailing arm and driving means
Figure 8:
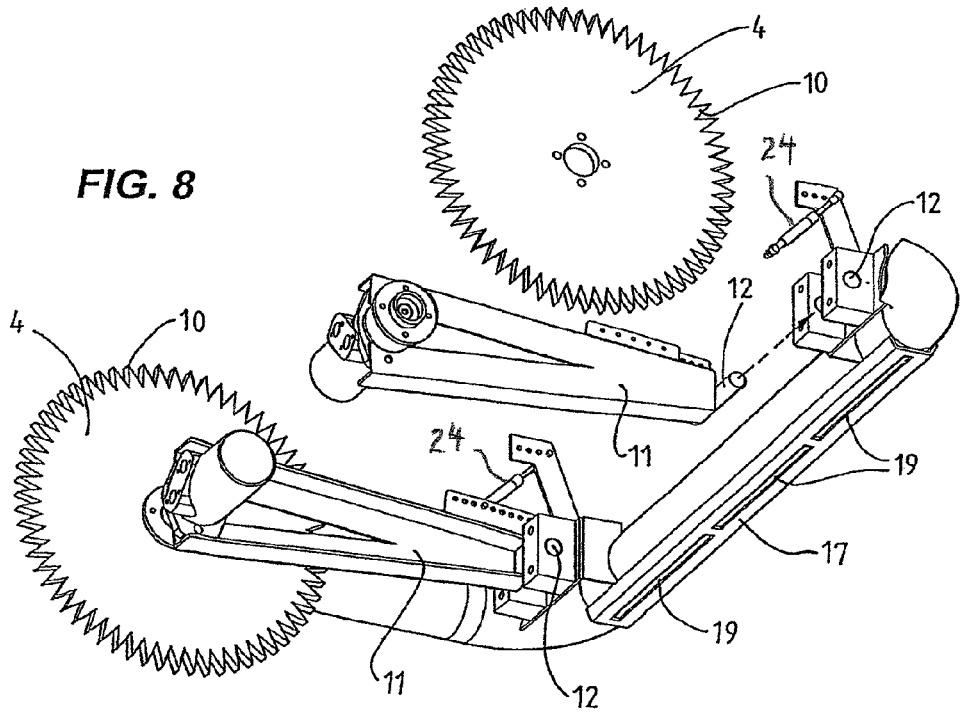
FIG. 8 shows an exploded view of the trailing arm and driving means

Legend
1. Skid chassis
2. Submarine net
3. Buoyancy means
4. Driving means (sprockets)
5. Propulsion means
6. Cleaning means
7. Vacuum conduit
8. Lower surface skids
9. Chassis cage
10. Sprocket teeth
11. Trailing arms
12. Pivot
13. Video camera
14. Lights
15. Linear tube lengths
16. Chassis elbows
17. Lower surface skids
18. Rear vacuum slot
19. Front vacuum slot
20. Transverse conduit
21. Central tee
22. Vacuum point
23. Servo motor
24. Gas strut
25. High pressure water spray jet The invention takes the form of a submersible and mobile vacuum cleaning device particularly adapted for submarine application for the cleaning and maintenance of submerged nets for the purpose of removing contamination and debris collection which routinely accumulates on nets submerged in a marine environment. Referring generally to the figures, the cleaner includes a rectangular or square skid chassis 1 formed of linear tube lengths 15 joined by elbows 16 so as to form a generally square and planar chassis for the cleaner.

The chassis forms the basis on which the components of the cleaner are mounted and is also provided with a chassis cage 9 mounted to the chassis so as to provide a generally cuboid structure into which the components of the cleaner are mounted and protected.

The skid chassis 1 is made up of generally tubular stainless steel and includes lower surface skids 17 having a curved and continuous smooth shape around the base of the chassis so as to ensure the chassis has the ability to freely skid and slide over netting 2 without snaring or snagging the net as it traverses the mounted nets during the cleaning operation.

The cleaner is provided with dual buoyancy tanks 3 mounted to either side of the chassis 1 within the confines of the chassis cage 9. The buoyancy tanks are adapted to provide suitable buoyancy so as to allow the cleaner the ability to freely move in a vertical orientation under water with minimal effort and maximum control.

The cleaner is provided with a driving means in the form of dual toothed sprockets 4 mounted within the confines of the chassis but adapted for movement relative to the plane of the chassis 1 by virtue of trailing arms 11 pivoted from pivot points 12 at the front of the chassis. In this manner, the position of the toothed sprockets 4 and the teeth 10 formed thereon, can be adjusted relative to the skid chassis so as to allow the sprocket to accommodate variations in net tension and movement of the device as it traverses undulations and folds or other imperfections in the net. The pivot point 12 of the trailing arms is positioned toward the front of the chassis 1 having regard to the generally preferred forward motion of the cleaner, such that any dips encountered by the cleaner as it traverses a net, encourages the teeth 10 of the sprockets 4 to further engage the net and maintain traction.

The pivoting movement preferably allows the sprocket to substantially retract into the chassis cage while allowing it to protrude about 75 mm, ensuring constant net engagement.

The cleaner of the invention is further provided with a propulsion means in the form of a centrally mounted propeller 5 which is adapted to provide a measured propulsion force so as to ensure the cleaner is gently held against the submarine net 2 during its operation.

The drive means and propulsion means are preferably driven hydraulically allowing ease of remote and low maintenance power application The cleaning means is designated generally by reference numeral 6. The cleaning function of the cleaning means 6 is provided by way of vacuum suction acting through forward and rear transverse vacuum slots 18 and 19. The forward and rear vacuum slots are formed in the front and rear linear tube lengths 15 of the chassis 1 with the hollow tubing formation of the chassis 1 functioning as a conduit for the vacuum means. The vacuum is conduited from the chassis by a transverse conduit 20, bridging the chassis and including a central tee-piece 21 so as to provide a central and uniform vacuum application point 22. In this manner, the vacuum conduit 7 in the form of a vacuum hose can be applied to one vacuum point 22 such that the vacuum suction is effected throughout the chassis and directed to the front and rear vacuum slots allowing the cleaner of the invention to apply vacuum suction to the net 2 as its skids or traverses across the surface thereof.

The cleaner of the invention is controlled remotely from a surface craft whereby the vacuum hose and hydraulic hoses feeding and controlling the drive means and propulsion means are bound together and accessed from the surface. In order to monitor the direction and movement of the cleaner, the cleaner is provided with video cameras 13, positioned at the forward and rear of the chassis in order to allow visual communication between the operator, the cleaner and the net. The video cameras are positioned toward the front and rear of the chassis and are provided with access to a water stream via the propulsion means 5 whereby a stream of water is projected across and around both cameras in order to ensure that the cameras do not become clogged or inoperable by accumulation of the released debris from the nets within the general environment of the lens. The net cleaner is also provided with lights 14 at the forward and rear to provide sufficient illumination of the net and environment of the cleaner to assist the operator in manipulating and driving the net cleaner.

In use, the net cleaning device of the invention provides a highly efficient and economical means of remotely cleaning submersed marine nets with a cleaning width in the order of 1000 mm being the effective width of the skid chassis. The particular scaling and dimensions of the cleaner can be varied in accordance with requirements with larger or smaller versions as required. The net cleaner of the invention can be taken to the required site in a barge or other flotation means and once the fouled net requiring cleaning has been reached, the net cleaner of the invention can be carefully lifted from the barge and suspended until the propeller is activated to effect an engagement between the device and the net. The device is then submerged where the buoyancy tanks allows the net cleaner to be submerged to the appropriate depth in a fully controlled manner. Once the net cleaner is suitably positioned and orientated with the skid chassis sitting on the surface of the net 2, activation of the propulsion means 5 ensures that the net cleaner is snugly held against the net and activation of the vacuum can commence thereby causing water to be drawn into the front and/or rear vacuum slots via the net. The process of drawing water past the net causes attached marine algae and other contamination to be pulled from the net and be sucked up the vacuuming system through the internal tubing of the skid chassis across the transverse conduit 20 and up into the vacuum hose. The outlet of the vacuum hose will be controlled by the operator whereby separation of the algae contamination can be effected and return of the bulk of the water to the immediate vicinity of the barge.

Figure 9:
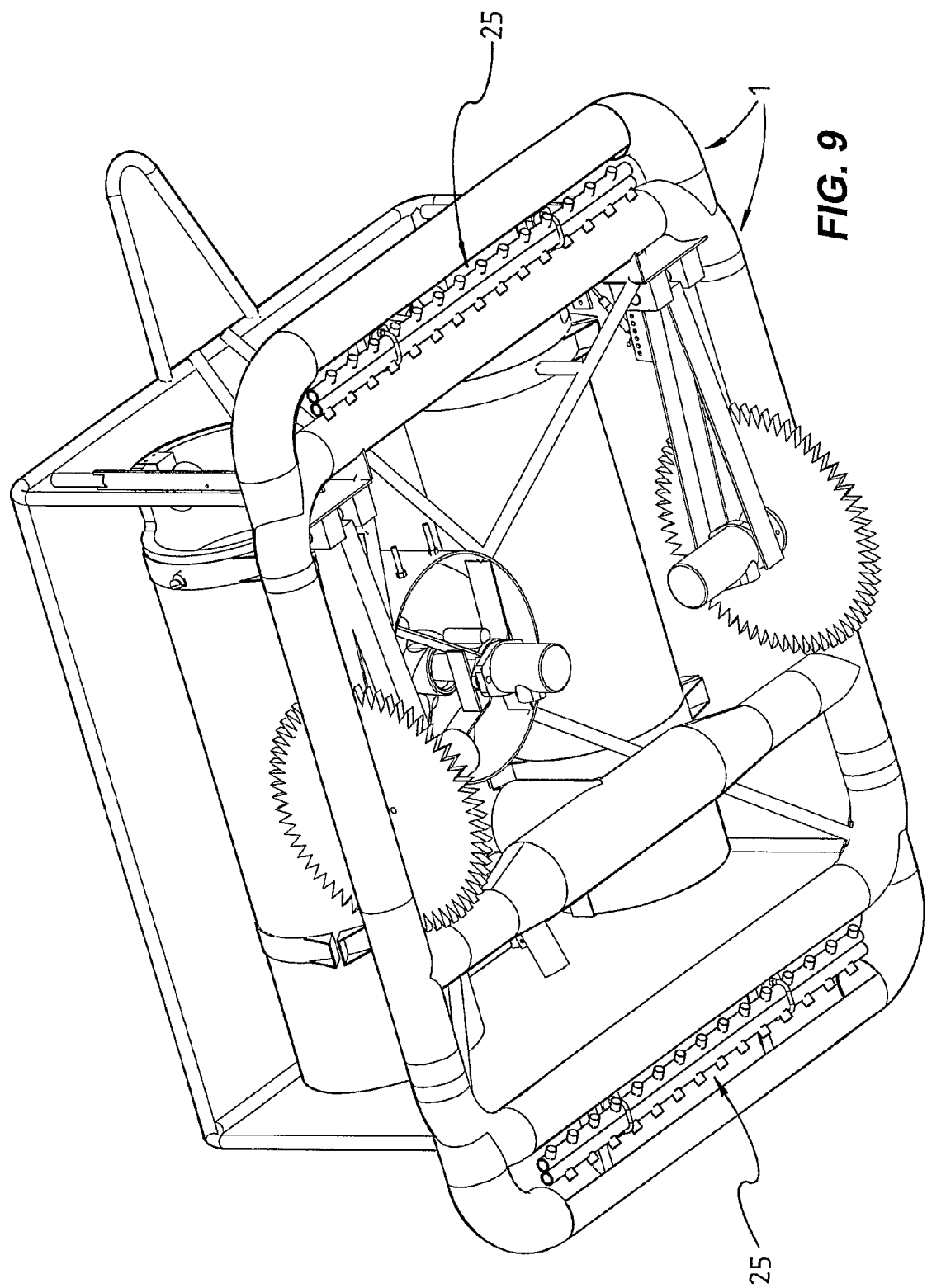
FIG. 9 shows an underside view of the cleaner incorporating high pressure water jets

In addition, and/or separately to the vacuum function of the net cleaning device, the device can additionally be provided with a series of high pressure water jets 25 preferably mounted to the skid chassis and directed downward so as to allow the device of the invention to direct a high pressure water spray onto the net being traversed so as to assist in the cleaning operation and/or be used for nets which are not coated in anti-foulant so as to assist in the lifting and removal of debris. Referring to FIGS. 9, 10a, 10b and 11, the high pressure water jets 25 are most preferably fitted to the front and rear portions of the skid chassis in the form of spray bars running parallel to the front and rear skid chassis and running the full width of the outside skid chassis frame and/or vacuum slots. The front and rear high pressure water jets are able to be operated independently so as to ensure that the jets function preferably after the vacuum operation of the device has been accomplished; such that when the device is moving in the forward direction, the high pressure water jets are applied to the rear spray bar such that in the order of 90% of the debris is removed from the nets and completely removed from the environment of the nets by way of the vacuum features of the device and the remainder of any debris left on the nets is removed by the high pressure water jets. Similarly, with the device moving in reverse, the high pressure water jets are operated by way of the forward position spray bar such that, the vast majority of debris is removed by the vacuum facilities of the device, with the remaining debris removed by the high pressure water spray. The spray bar is preferably height adjustable above the net mesh with the angle adjusted relative to said net. Nozzles of various types can be used to affect the desired spray form.

The net cleaner of the invention is manipulated and moved by activation of the driven means where the two side positioned sprockets are driving independently by separate servo motors in a manner such that the forward activation of both sprockets causes the trailing arms to automatically descend or move through the plane of the chassis so as to engage the net where the sprocket teeth 10 are sized and configured to specifically engage the mesh of the net. The driving of the sprocket wheels thereby causes the skid chassis and the whole net cleaner to move across the surface of the net 2 thereby progressively and methodically applying vacuum over the whole net. The independent control of the tooth sprockets, allows the machine to be moved forward, back or steered thereby giving the operator full control over the manipulation of the cleaner. The teeth sprockets 4 are preferably constructed using UHD polyethylene plastic in order to minimise potential damage to the net and also provide the additional advantage that if they incur some damage to one or other of the teeth during installation and activation, minimal damage will occur to the mesh part of the net. The tooth sprockets are suspended from pivoted trailing arms 11, which are adapted to drop down to about 500 mm below the plane of the skid base. This range of engagement ensures that the driving means is sufficient to allow the cleaner to traverse changes in the angle of the net relative to the base. The forward mounting of the pivot relative to the general forward direction of the cleaner and at a point higher than the bottom teeth of the sprocket ensures that the sprockets rotate at a forward direction with the arms being pulled down into any dips in the mesh, thereby ensuring constant traction. The trailing arms are provided with gas struts 24 to apply a constant pressure to the net.

While a particularly preferred embodiment of the invention has been specifically designed and configured for use on multi-filament nylon mesh between 15 mm bar and 25 mm bar, the size and configuration of the driving sprockets can be readily adapted for a wide range of netting types including nets up to about 50 mm bar size and/or nets with a smooth PVC type plastic finish.

The buoyancy tanks are most preferably mounted just above the centre of gravity of the cleaner so as to ensure that the cleaner is naturally self-righting. The buoyancy tanks preferably provide about 10 kg less buoyancy than the submerged weight of the cleaner itself, thereby alleviating most of the strain and stress put on the net as the cleaner climbs the side wall of a submerged net.

The video cameras are preferably provided with a wide angle of up to 110 degrees vision at the forward and rear of the cleaner, thereby providing the operator with complete visual communication and control of the cleaner. The comprehensive video facilities of the device provide a clear and reliable inspection function where the device allows thorough inspection of submerged nets.

The invention provides for the first time, an in situ marine net cleaner particularly adapted for use on compliant nets formed of softer (non metallic) materials, allowing operation by one person from the surface without the requirements for diver assistance. The net cleaner of the invention is able to provide a vastly improved cleaning rate of more than 6000 square meters per day.

The efficiency of the machine is such that it is now possible to clean and maintain non anti-fouled nets, which by their very nature require more aggressive cleaning action and in this respect, the net cleaner of the invention may be provided with auxiliary brushes, water hoses etc. for delivery of water jets or pressurised water to the net as previously described, in order to provide a more aggressive cleaning action to supplement the vacuum drawing in of dislodged waste and debris.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A submarine in-situ net cleaner comprising:
   a skid chassis adapted for smooth and snare free sliding across the surface of a net,
   a buoyancy device associated with said chassis to provide said net cleaner with buoyancy,
   a driving device adapted to cooperate with said net and manoeuvre said net cleaner about the surface of said net,
   a propulsion device adapted to propel said net cleaner onto and maintain contact with said net, and
   a cleaning device adapted to cooperate with said skid chassis to remove contaminants from said net including marine fouling from the surface of said net so as to clean said net,
   wherein each of the driving device, the propulsion device and the cleaning device are connected to the skid chassis, one of:
   a) directly and
   b) indirectly.

2. A cleaner according to claim 1, wherein said skid chassis includes lower skids of a generally planar and rectangular formation of tubular material having curved lower surfaces shaped to avoid snagging of said net.

3. A cleaner according to claim 2, wherein said chassis includes a cage fitted to said lower skids.

4. A cleaner according to claim 3, wherein said buoyancy device includes dual buoyancy tanks positioned either side within said chassis cage.

5. A cleaner according to claim 2, wherein said cleaning device is a vacuum conduited through said chassis and delivered through vacuum slots formed in a lower edge of said lower skids.

6. A cleaner according to claim 1, wherein said chassis is formed of tubular stainless steel.

7. A cleaner according to claim 1, wherein said driving device includes a pair of toothed sprockets positioned within either side of said chassis.

8. A cleaner according to claim 7, wherein said skid chassis includes lower skids of a generally planar and rectangular formation of tubular material having curved lower surfaces shaped to avoid snagging of said net and a cage fitted to said lower skids, and said toothed sprockets are suspended from pivoted trailing arms for movement between a substantially retracted position within the chassis cage and an extended position protruding out of said cage past the plane of said lower skids.

9. A cleaner according to claim 8, wherein said trailing arms are pivoted from a front of said chassis to cause said arms to be automatically pulled downward or extended into any dips encountered in the net, thereby maintaining traction over variations in a mesh surface of the net.

10. A cleaner according to claim 7, wherein said toothed sprocket has sprockets spaced and configured to allow teeth thereof to fully and positively engage a lattice of said net.

11. A cleaner according to claim 7, wherein said toothed sprockets are rotationally driven by a hydraulic device and can be rotated in either direction at independent speeds.

12. A cleaner according to claim 7, wherein said toothed sprockets are independently driven to allow forward, reverse and steering movement.

13. A cleaner according to claim 1, wherein said cleaning device includes a vacuum adapted to draw water and contaminants through and from the surface of said net.

14. A cleaner according to claim 13, including a high pressure water spray jet positioned exterior to said skid chassis at least at one of a front and rear thereof wherein said water spray jet is adapted for independent operation to said vacuum.

15. A cleaner according to claim 1, wherein said buoyancy device is fixed to allow ease of flotation and manoeuvrability of said cleaner.

16. A cleaner according to claim 15, wherein said buoyancy is set at about 10 kg less buoyancy than a submerged weight of said cleaner.

17. A cleaner according to claim 1, further including video cameras fitted to a front and rear of said cleaner.

18. A cleaner according to claim 17, further including an automatic cleaning device for a lens of each said camera including a pump to cause a flow of water to be directed across and around said lens to prevent settlement of debris and dislodged contaminants within the environment of said lens.

19. A cleaner according to claim 18, wherein said water flow is integrated with said propulsion device.

20. A cleaner according to claim 1, wherein said propulsion device includes a transverse hydraulically driven propeller directing water through said chassis.

* * * * *